(12) United States Patent
Nakamura

(10) Patent No.: US 8,298,699 B2
(45) Date of Patent: Oct. 30, 2012

(54) POWER STORAGE DEVICE

(75) Inventor: Yoshiyuki Nakamura, Nishikamo-gun (JP)

(73) Assignee: Toyota Jidosha Kabushiki Kaihsa, Toyota-shi (JP)

( * ) Notice: Subject to any disclaimer, the term of this patent is extended or adjusted under 35 U.S.C. 154(b) by 575 days.

(21) Appl. No.: 12/527,842

(22) PCT Filed: Feb. 19, 2008

(86) PCT No.: PCT/IB2008/000371
§ 371 (c)(1), (2), (4) Date: Aug. 19, 2009

(87) PCT Pub. No.: WO2008/102236
PCT Pub. Date: Aug. 28, 2008

(65) Prior Publication Data
US 2010/0055547 A1 Mar. 4, 2010

(30) Foreign Application Priority Data
Feb. 20, 2007 (JP) ................................ 2007-038882

(51) Int. Cl.
*H01M 10/50* (2006.01)
*H05K 7/20* (2006.01)
(52) U.S. Cl. ....................................... 429/120; 361/692
(58) Field of Classification Search ................... 429/62, 429/120; 361/692, 693
See application file for complete search history.

(56) References Cited

U.S. PATENT DOCUMENTS

| 5,571,630 | A | 11/1996 | Cheiky | |
|---|---|---|---|---|
| 6,441,312 | B1 * | 8/2002 | Tanimura et al. | 361/692 X |
| 8,003,245 | B2 * | 8/2011 | Lee et al. | 429/120 X |
| 2004/0137313 | A1 | 7/2004 | Jaura et al. | |
| 2006/0115714 | A1 * | 6/2006 | Lee et al. | 429/120 X |

FOREIGN PATENT DOCUMENTS

| EP | 0 177 225 A1 | 4/1986 |
|---|---|---|
| GB | 2 289 977 A | 12/1995 |
| JP | 61-173470 | 8/1986 |
| JP | 2001-043905 A | 2/2001 |
| JP | 2004-031281 A | 1/2004 |
| JP | 2004-152769 A | 5/2004 |
| JP | 2005-071784 A | 3/2005 |
| JP | 2005-294023 A | 10/2005 |
| JP | 2006-244756 A | 9/2006 |
| JP | 2006-351245 A | 12/2006 |
| JP | 2007-018917 A | 1/2007 |
| JP | 2007-123147 A | 5/2007 |
| WO | WO 2005/096412 A1 | 10/2005 |
| WO | WO 2006/135008 A1 | 12/2006 |

* cited by examiner

*Primary Examiner* — Stephen J. Kalafut
(74) *Attorney, Agent, or Firm* — Kenyon & Kenyon LLP

(57) ABSTRACT

A power supply device in which a plurality of power supplying bodies are stacked is provided with a plurality of holes that extend from one end side to the other end side in the stacking direction of the power supply device and through which coolant flows. The power supply device is also provided with a guide portion that leads coolant that has passed through a first hole which is provided in a first region of the power supply device into a second hole which is provided in a second region of the power supply device which radiates heat better than the first region does.

18 Claims, 7 Drawing Sheets

RELATED ART

POWER STORAGE DEVICE

This is a 371 national phase application of PCT/IB2008/000371 filed 19 Feb. 2008, claiming priority to Japanese Patent Application No. 2007-038882 filed 20 Feb. 2007, the contents of which are incorporated herein by reference.

BACKGROUND OF THE INVENTION

1. Field of the Invention

The invention relates to a power storage device.

2. Description of the Related Art

A known power storage device such as a secondary battery or an electric double layer capacitor (condenser) is used as a battery for hybrid and electric vehicles. When charging and discharging, the power storage device generates heat which reduces the performance and life of the power storage device. Therefore, various technologies to cool the power storage device (or the case housing the power storage device) using coolant (gas or liquid) have been proposed.

However, as power storage devices continue to be made with greater output and higher densities, an assembled battery or battery pack formed of a plurality of single cells stacked together, for example, may not be able to be cooled sufficiently.

That is, although coolant directly contacts the outer surface of the battery pack, it does not come into contact with the region on the inside of the battery pack, which makes cooling that region difficult. More specifically, with a battery pack formed of a plurality of single cells stacked together, in which each single cell has a positive electrode body and a negative electrode body stacked together with an electrolyte layer in between, heat in the region toward the center of the battery pack cannot easily escape so the temperature in that region becomes higher than the region on the outer peripheral side of the battery pack. This results in a temperature variation between the center area and the outer peripheral area of the battery pack.

In this way, there is a variation in the temperature distribution in a plane perpendicular to the stacking direction of a single cell. If a single cell is not cooled uniformly on this plane which is perpendicular to the stacking direction, charging and discharging performance will not be stable, and moreover, it will shorten the life of the power storage device.

Therefore, related art described in Japanese Patent Application Publication No. 2004-31281 (JP-A-2004-31281) and Japanese Patent Application Publication No. 2005-71784 (JP-A-2005-71784) provides cooling fins (i.e., heat radiating fins) on a stacked battery and performs heat exchange between the inner portion of the stacked battery and coolant.

FIGS. 9A and 9B are diagrams illustrating a cooling method of related art. Typically, the power storage device is cooled by running coolant into the power storage device and discharging the coolant that has been heated by heat exchange with a plurality of power storing bodies that make up the power storage device to outside the power storage device. FIG. 9A is a diagram illustrating a cross-flow cooling method in which an inflow of coolant flowing into the power storage device which is housed in a case and an outflow of coolant that flows out from the case are in the same direction across (i.e., on opposite sides of) the power storage device (i.e., power storing bodies). FIG. 9B is a diagram illustrating a counter-flow cooling method in which the inflow and the outflow of the coolant are on the same side of the power storage device (i.e., power storing bodies) so coolant that flows into the case flows through the power storage device (i.e., power storing bodies) and then returns to the inlet side from which it flows back out of the case.

However, heat in the region toward the center of the power storage device, which is made up of a plurality of power storing bodies stacked together, has difficulty escaping, and as a result, the temperature in the region toward the center becomes higher than the temperature in the region toward the outer periphery. Therefore, the amount of heat exchange between the coolant and the power storing bodies in the region toward the center is different from the amount of heat exchange between the coolant and the power storing bodies in the region toward the outer periphery. That is, even with a structure in which the inner portion of the battery is cooled using cooling fins, as is the case with JP-A-2004-31281 and JP-A-2005-71784, it is still difficult to cool a single power storing body uniformly using the cross-flow cooling method or the counter-flow cooling method.

In other words, neither the cross-flow cooling method nor the counter-flow cooling method of the related art takes into account the variation in the temperature distribution between the region toward the center of the power storage device and the region toward the outer periphery of the power storage device. With both methods, the coolant simply flows in one direction through a plurality of flow paths. As a result, the variation in the temperature in the power storage device in a plane perpendicular to the stacking direction of the power storage device is unable to be suppressed.

Also, with both the cross-flow cooling method and the counter-flow cooling method of the related art, from the standpoint of having the coolant flow through the entire power storage device, the inflow portion and the outflow portion of the coolant are positioned apart from one another. Because a duct or the like is required for each portion, this increases the number of parts. Specifically, at least two ducts must be provided, i.e., one for the coolant inflow side and one for the coolant outflow side, and these ducts take up space. This makes it difficult to make the power storage device smaller so that it takes up less space.

SUMMARY OF THE INVENTION

This invention thus provides a power storage device that can suppress a variation in temperature in a plane perpendicular to the stacking direction.

A first aspect of the invention relates to a power storage device provided with a power storing body that has a stacked structure. This power storage device also has i) a plurality of holes that extend from one end side to the other end side in a stacking direction of the power storing body and through which coolant flows, the plurality of holes including a first hole provided in a first region of the power storing body and a second hole provided in a second region which radiates heat better than the first region does; and ii) a guide portion that leads coolant which has passed through the first hole into the second hole.

Also, the guide portion may lead coolant that has passed through the first hole into the second hole such that an inflow side of the coolant in the first hole and an outflow side of the coolant in the second hole are on the one end side in the stacking direction of the power storing body.

Also, the power storage device may be provided with a pair of retaining members that retain the power storing body in the stacking direction, an inflow portion through which coolant flows into the first region, and an outflow portion through which coolant flows out from the second region to outside the power storage device. The inflow portion and the outflow portion may be provided on one of the retaining members and the guide portion may be provided on the other retaining member.

Further, the inflow portion and the outflow portion may be provided on the same side of the one retaining member, and may be adjacent to one another in the lengthwise direction of the one retaining member.

Also, the one retaining member may have a dividing portion that separates the coolant that flows into the inflow portion from the coolant that flows out from the outflow portion.

Also, the one retaining member may have a recessed portion on a surface that faces the power storing body, and the recessed portion may be divided into a portion corresponding to the first region and a portion corresponding to the second region by the dividing portion.

Further, the one retaining member may have an open portion that is open in the stacking direction of the power storing body, and the open portion may be divided into a portion corresponding to the first region and a portion corresponding to the second region by the dividing portion.

Also, the one retaining member may be formed in a plate shape with a hollow portion inside, and the hollow portion may be divided into a portion corresponding to the first region and a portion corresponding to the second region by the dividing portion. Also, a surface of the one retaining member on the side that faces the power storing body may have a plurality of holes in positions corresponding to the holes provided in the power storing body.

Also, the first region may be a region that is positioned at substantially a center portion of the power storage device and the second region may sandwich the first region from both sides or surround the first region. Further, the power storing body may have an electrode layer and a plurality of electrode bodies that are stacked with the electrolyte layer in between, and the hole may be provided through the power storing body so as to extend from the one end side of the power storage device to the other end side of the power storage device.

Accordingly, the invention makes it possible to suppress a variation in temperature in a plane perpendicular to the stacking direction of a power storage device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1A:
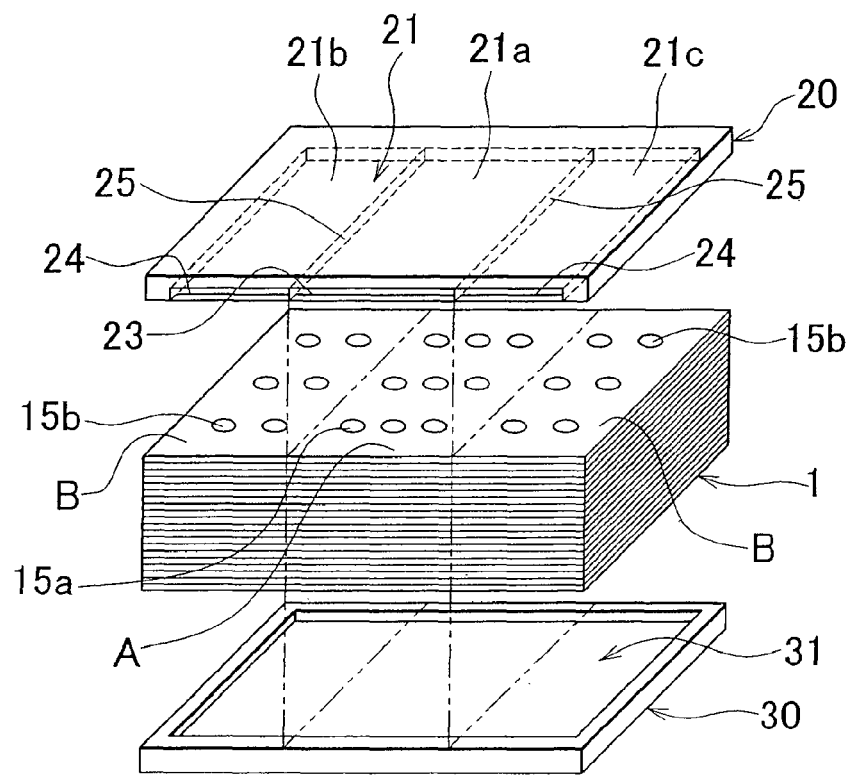
FIGS. 1A and 1B are views of a power storage device according to a first example embodiment of the invention, with FIG. 1A being an exploded perspective view and FIG. 1B being an external perspective view of the power storage device.
Figure 1B:
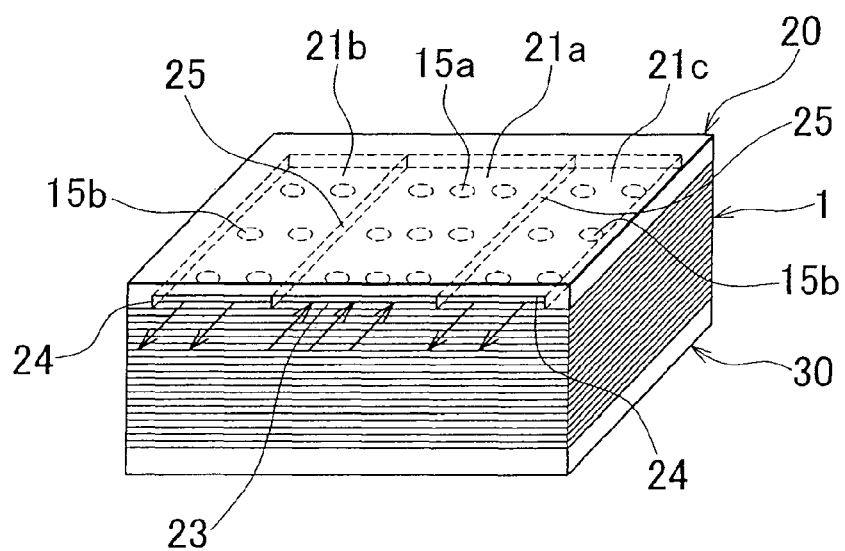

In the following description and the accompanying drawings, the present invention will be described in more detail in terms of example embodiments. FIGS. 1A and 1B are perspective views showing the structure of a power storage device according to a first example embodiment of the invention. In this example embodiment, a bipolar battery will be described as an example of the power storage device, but the invention may also be applied to an electric double layer capacitor (condenser) which is used as the power storage device.

As shown in FIGS. 1A and 1B, the power storage device of this example embodiment includes a bipolar battery (assembled battery or battery pack) 1 and a pair of retaining members that retain a plurality of single cells in the stacking direction. This pair of retaining members is made up of an upper retaining member 20 and a lower retaining member 30 which are arranged so as to sandwich the bipolar battery 1 in the stacking direction.

Figure 2:
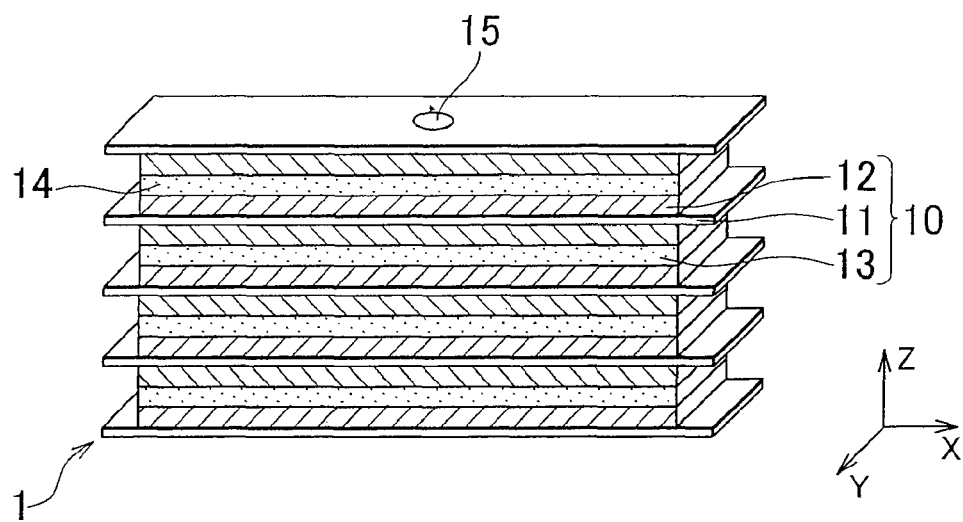
FIG. 2 is an external perspective view of a bipolar battery according to the first example embodiment.
Figure 3:
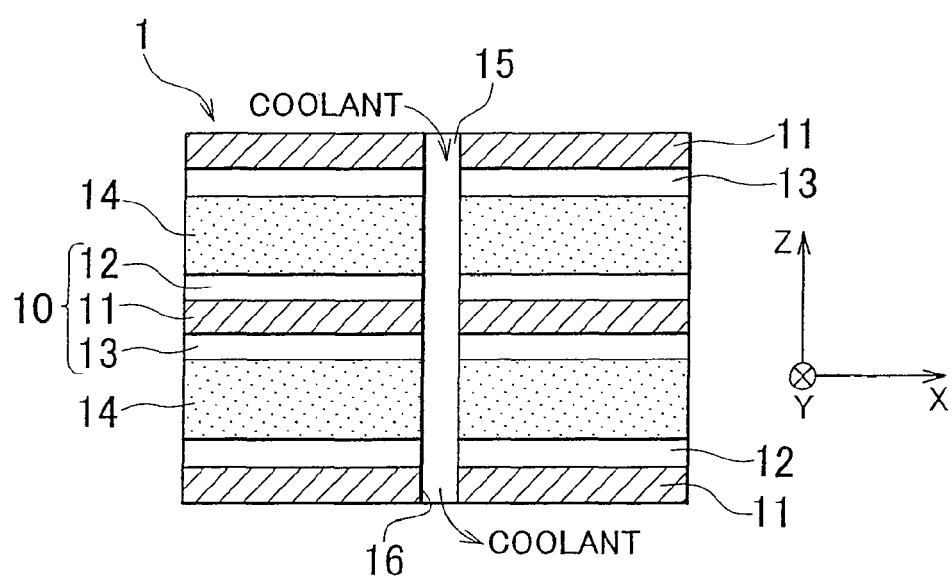
FIG. 3 is a sectional view of the bipolar battery according to the first example embodiment.

FIG. 2 is an external perspective view schematically showing the structure of the bipolar battery 1. FIG. 3 is a sectional view showing the internal structure of the bipolar battery 1. The section shown includes one hole formed in the bipolar battery 1.

As shown in FIGS. 2 and 3, the bipolar battery 1 is formed of a plurality of bipolar electrodes (electrode bodies) 10 which are stacked together with a solid electrolyte layer 14 in between adjacent electrodes 10. Incidentally, the number of stacked single cells may be set as appropriate.

A positive electrode layer 12 is formed on one side of a collector 11 and a negative electrode layer 13 is formed on the other side of the collector 11. These electrode layers 12 and 13, together with the collector 11, form one bipolar electrode 10. The electrode layers 12 and 13 may be formed on the collector 11 using the inkjet method or the like.

Also, an electrode layer (either a positive electrode layer or a negative electrode layer) is formed on only one side of each of the two collectors 11 that are positioned at the ends in the stacking direction (i.e., the Z direction in the drawings) of the bipolar battery 1. Further, an electrode tab (either a positive electrode tab or a negative electrode tab) for extracting current is electrically and mechanically connected to the other side of each of those two collectors 11 (not shown).

The bipolar battery 1 in this example embodiment also has holes 15 (only one is shown in FIGS. 2 and 3) which extend from one end side to the other end side in the stacking direction provided in the surface that is perpendicular to the stacking direction (i.e., this surface is along a plane that lies in the X-Y direction (i.e., the stacking plane) and will hereinafter be referred to as the "stacking plane"). Both ends of the holes 15 are exposed to the outside at both end surfaces of the bipolar battery 1 such that the holes 15 run through the bipolar battery 1.

The holes 15 all have generally the same diameter and a generally circular sectional shape (in the stacking plane), and an insulating layer 16 made of polymer resin or the like is formed on the inner peripheral surfaces of the holes 15. Incidentally, the diameter of the holes 15 is large enough for coolant to pass through.

Here, the specific manufacturing method of the bipolar battery 1 having these holes 15 will now be described. First, when manufacturing the bipolar battery 1 by application using the inkjet method or the like, the bipolar battery 1 having the holes 15 may be formed without applying material that forms the bipolar electrode 10 and the solid electrolyte layer 14 to the portions where the holes 15 are formed. More specifically, those portions are masked using a masking member so that the foregoing material is not applied to them.

On the other hand, when the bipolar electrode 10 and the solid electrolyte layer 14 are first formed and then stacked together, the bipolar battery 1 may be formed by forming the holes 15 during the process of forming these members.

For example, when forming the solid electrolyte layer 14 by press forming, the holes 15 may also be formed during this press forming. Also, when forming the collector 11 by cutting a long sheet of metal foil or the like, the portions corresponding to the holes 15 may be removed (i.e., cut out) at this time. The bipolar electrode 10 can be obtained by applying the material that forms the electrode layers 12 and 13 to the collector 11 in which the holes 15 have already been formed. At this time the material that will form the electrode layers 12 and 13 is applied to the entire surface of collector 11 except for where the holes 15 are.

The upper retaining member 20 is a plate-shaped member that has a thickness in the stacking direction of the bipolar battery 1 and is formed to either be the same length and width (i.e., have the same dimensions in the X and Y directions) as the bipolar battery 1 or longer and wider than the bipolar battery 1. A recessed portion 21 which has a surface that is recessed with respect to the bipolar battery 1 is formed in the surface of the upper retaining member 20 opposing the bipolar battery 1. When the upper retaining member 20 is arranged on one end side of the power storage device 1, a space is formed between the upper retaining member 20 and the power storage device 1 by this recessed portion (i.e., recessed surface 21).

Also, the recessed portion 21 is formed in a position that corresponds to a first region A which is positioned in substantially a center portion of the bipolar battery 1, as well as to second regions B that are adjacent to this first region A, i.e., that sandwich the first region A from both sides. In this example embodiment, a first recessed portion 21a which corresponds to the first region A, as well as second recessed portions 21b and 21c that correspond to the second regions B, are formed in the upper retaining member 20. Also, the first recessed portion 21a is divided from both the second recessed portion 21b and the second recessed portion 21c by protruding portions (i.e., dividing portions 25) that protrude toward the power storage device 1 from the recessed portion 21. Accordingly, when the upper retaining member 20 is arranged on one end side of the bipolar battery 1, individual spaces are formed between the upper retaining member 20 and the bipolar battery 1 by these recessed portions and the dividing portions 25.

An inflow portion 23 through which coolant flows into the bipolar battery 1, and an outflow portion 24 through which coolant that has passed through the bipolar battery 1 flows out of the bipolar battery 1 are formed on a side surface of the upper retaining portion 20. The inflow portion 23 is an open portion that provides communication between the first recessed portion 21a corresponding to the first region A and a coolant supply duct. The outflow portion 24 is an open portion that provides communication between the second recessed portions 21b and 21c corresponding to the second regions B and a coolant discharge duct. In this example embodiment, the inflow portion 23 and the outflow portion 24 are provided on the same side of the upper retaining member 20 and parallel to one another in the length direction of the upper retaining member 20.

The lower retaining portion 30 is a plate-shaped member that has a thickness in the stacking direction of the bipolar battery 1 and, like the upper retaining portion 20, is formed to either be the same length and width (i.e., have the same dimensions in the X and Y directions) as the bipolar battery 1 or longer and wider than the bipolar battery 1. A recessed portion (a guide portion) 31 which has a surface that is recessed with respect to the bipolar battery 1 is formed in the surface of the lower retaining member 30 opposing the bipolar battery 1. When the lower retaining member 30 is arranged on the other end side of the power storage device 1 which is opposite the end side on which the upper retaining member 20 is arranged, a space is formed between the lower retaining member 30 and the power storage device 1 by the recessed surface of this recessed portion 31.

The recessed portion 31 provided in the lower retaining member 30 is formed extending across the first region A and the second regions B of the power storage device 1. With the upper retaining member 20, when it is arranged on one end side of the bipolar battery 1, individual spaces are formed corresponding to the first and second regions A and B (i.e., spaces are formed which correspond to the first and second regions A and B which are divided by the dividing portions 25). With the lower retaining member 30, however, when it is arranged on the other end side of the power storage device 1, a space is formed by the recessed portion 31 that continues from the first region A to the second regions B of the power storage device 1 such that coolant which has passed through the holes 15 (i.e., first holes 15a) in the first region A can flow through the holes 15 (i.e., second holes 15b) in the second regions B.

Here, the first and second regions A and B of the power storage device 1 will be described. The first region A is a region toward the center of the power storage device 1, from which heat generated by charging and discharging can not easily escape, as described above. The second regions B are regions around the center portion (i.e., regions on the outer peripheral side of the bipolar battery 1, from which heat generated by charging and discharging escapes easier than it does from the first region A because the second regions B are closer to the outer periphery of the bipolar battery 1 than the first region A is.

That is, the second regions B of the bipolar battery 1 have the ability to radiate heat better than the first region A does, i.e., the first region A does not radiate heat as well as the second regions B do. In this example embodiment, the inflow portion 23 of the coolant is provided in the position where the first recessed portion 21a corresponding to the first region A is formed, and the outflow portions 24 of the coolant are provided in positions where the second recessed portions 21b and 21c corresponding to the second regions B are formed. Also, the recessed portion 31 is provided in the lower retaining member 30.

Figure 4:
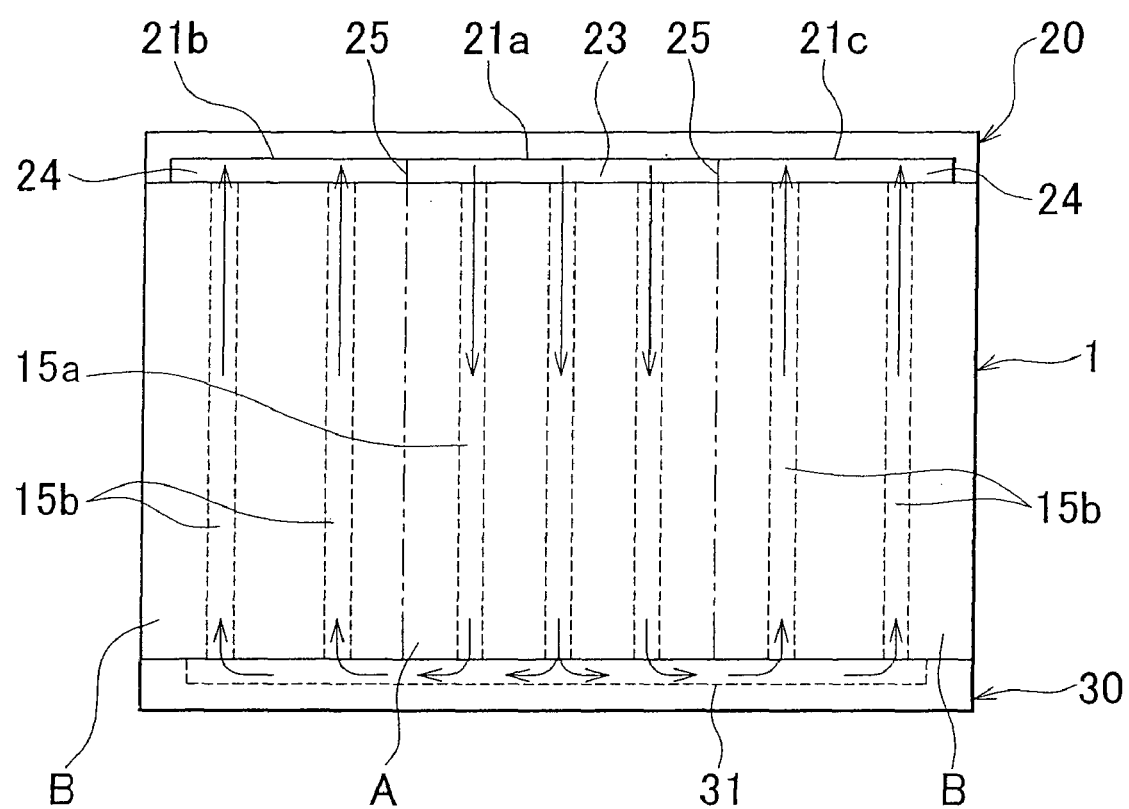
FIG. 4 is a sectional view of the power storage device according to the first example embodiment.

As shown in FIG. 4, coolant flows through the inflow portion 23 into the first region A where heat at the center portion of the bipolar battery 1 tends to build up. The coolant then flows through the holes 15a formed in this portion toward the lower retaining member 30, i.e., from one end side toward the other end side in the stacking direction. The coolant that flows from the holes 15a out into the recessed portion 31 of the lower retaining member 30 is then led by that recessed portion 31 so that it flows into the holes 15b formed in the second regions B which are adjacent to the left and right of the first region A. In this way, the coolant flows through the holes 15a then flows through the holes 15b toward the upper retaining member, i.e., from the other end side to the one end side in the stacking direction, and then out of the bipolar battery 1 from the second regions B through the outflow portion 24.

That is, the recessed portion 31 formed in the lower retaining member 30 in this example embodiment leads the coolant that has passed through the holes 15a into the holes 15b such that the inflow side of the holes 15a formed in the first region A of the bipolar battery 1 and the outflow side of the holes 15b formed in the second regions B are on one side of the bipolar battery 1. Therefore, the direction of flow of the coolant that flows through the holes 15a of the first region A is opposite the direction of flow of the coolant that flows through the holes 15b of the second regions B, i.e., the coolant flows in one direction through the holes 15a and in the opposite direction through the holes 15b.

Figure 5A:
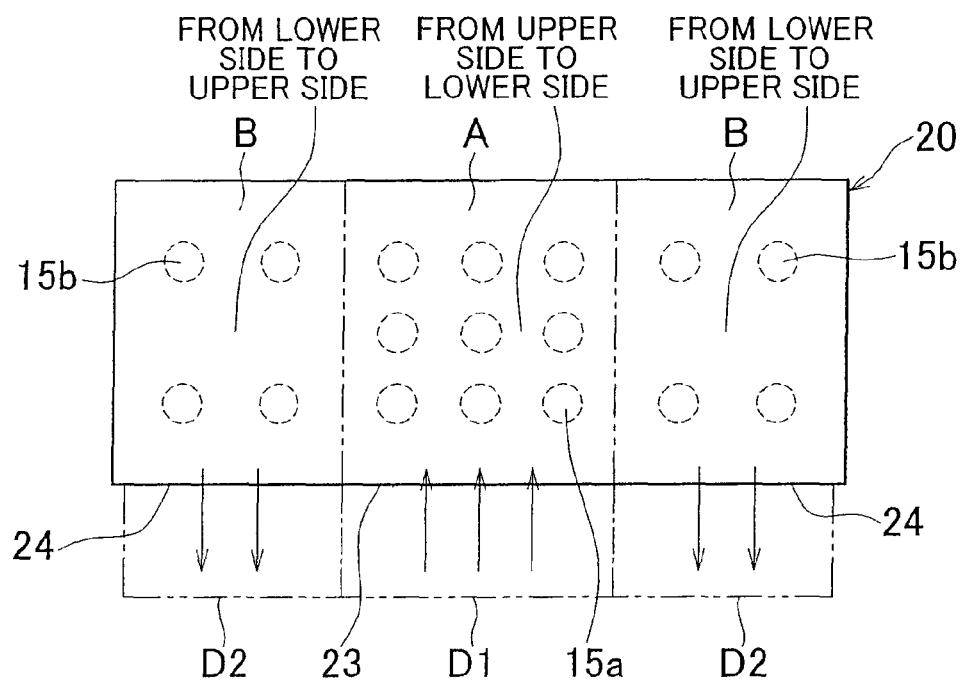
FIGS. 5A and 5B are views of the power storage device according to the first example embodiment, with FIG. 5A being a top view and FIG. 5B being a side view.

Therefore, as shown in FIG. 5A, the coolant that flows into the first region A (i.e., the holes 15a) flows toward the lower retaining member 30 while being heated by heat exchange with the bipolar battery 1 in the first region A, and the coolant that flows into the second regions B (i.e., the holes 15b) flows toward the upper retaining member 20 while performing heat exchange with the bipolar battery 1 in the second regions B.

At this time, the first regions A on the center portion side of the bipolar battery 1 is cooled by the coolant which has not yet been heated by heat exchange with the bipolar battery 1, while the second regions B on the outer peripheral portion side of the bipolar battery 1 are cooled by heat exchange with the coolant that has been heated by heat exchange with the first region A of the bipolar battery 1. That is, the second regions B, which are able to radiate heat well, are able to be cooled so that their temperatures do not become lower than the temperature of the first region A by reducing the amount of heat exchange between them (i.e., the second regions B) and the coolant, while suppressing a rise in temperature on the center portion side of the bipolar battery 1 by increasing the amount of heat exchange between the first region A, which does not radiate heat very well, and the coolant. Incidentally, in FIG. 5B, the solid arrows indicate the direction of flow of the coolant that flows into the first region A via the inflow portion 23 and then through the holes 15a, while the alternate-long-and-short-dashes arrows indicate the direction of flow of the coolant that flows out from the holes 15a into the recessed portion 31 of the lower retaining member 30, then through the holes 15b of the second regions B, and out of the bipolar battery 1 through the outflow portions 24.

In this way, the bipolar battery 1 in this example embodiment is able to suppress a variation in temperature distribution in a plane perpendicular to the stacking direction by having coolant first flow into a first region that does not radiate heat very well and then flow through a second region that radiates heat better than the first region does, which enables the bipolar battery 1 to exhibit stable charging and discharging performance. As a result, a reduction in the life of the bipolar battery 1 can be suppressed.

Figure 5B:
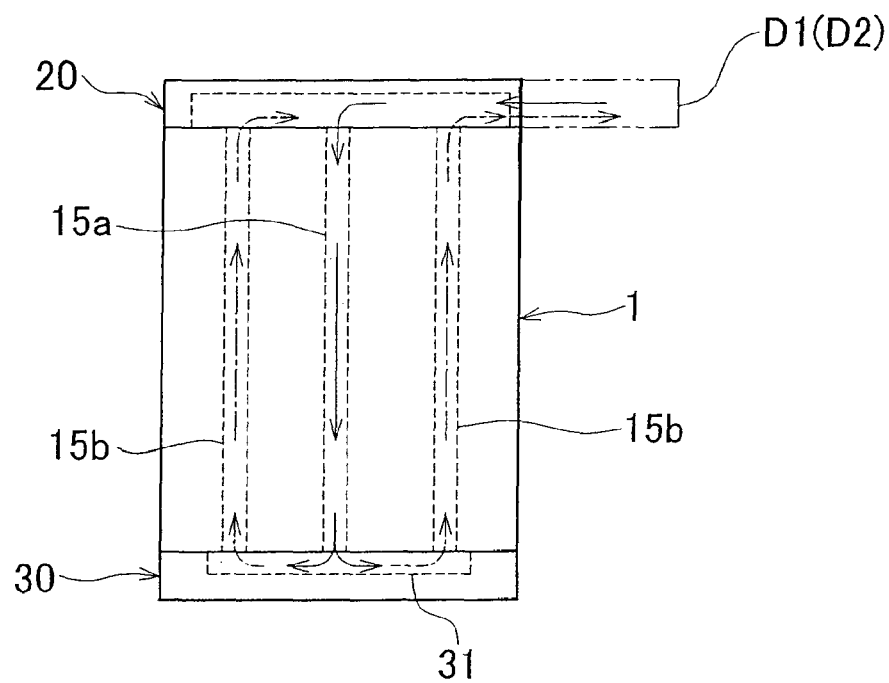

Also, in the bipolar battery 1 of this example embodiment, the recessed portion (i.e., the guide portion) 31 leads coolant that has passed through the holes 15a into the holes 15b such that the inflow side of the holes 15a formed in the first region A of the bipolar battery 1 and the outflow side of the holes 15b formed in the second regions B are on the one end side of the bipolar battery 1. Therefore, as shown in FIGS. 5A and 5B, the duct D1 that supplies coolant to the inflow portion 23 and the duct D2 that discharges coolant flowing out from the outflow portion 24 are able to be arranged on the same side of the bipolar battery 1 and adjacent to each other in the same plane that is perpendicular to the stacking direction.

Therefore, the duct D1 and the duct D2 can be formed as a single duct D, which reduces the number of parts. Compared with a structure such as that of the related art in which at least two ducts must be provided on the coolant inflow and outflow sides, less space is required to arrange the ducts, which means that the bipolar battery 1 takes up less space.

Figure 6:
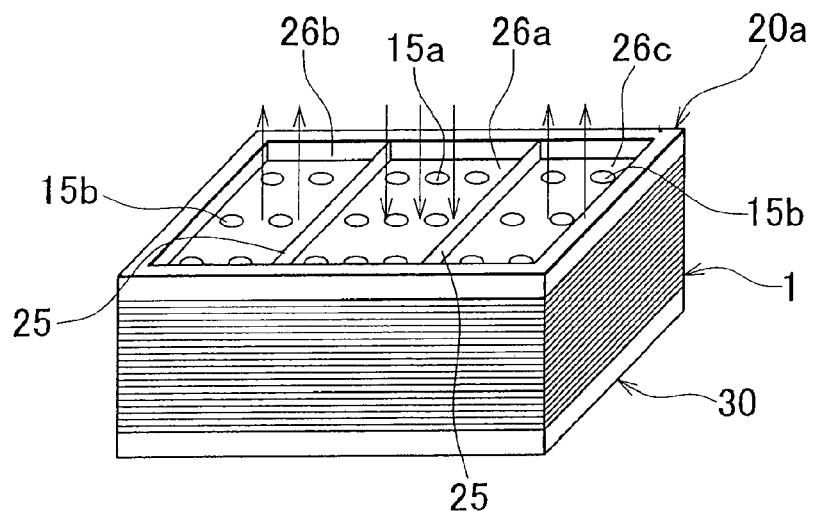
FIG. 6 is an external perspective view of a power storage device according to a second example embodiment of the invention.

FIG. 6 is a perspective view of the structure of a power storage device according to a second example embodiment of the invention. In this example embodiment, the inflow portion 23 and the outflow portion 24 provided in the upper retaining member 20 in the first example embodiment described above are provided on the upper surface of the upper retaining portion 20. Incidentally, structure of the second example embodiment that is the same as the structure of the first example embodiment will be denoted by the same reference characters and descriptions of that structure will be omitted.

As shown in FIG. 6, an upper retaining portion 20a in this example embodiment is a plate-shaped member that has a thickness in the stacking direction of the bipolar battery 1 and is formed to either be the same length and width as the bipolar battery 1 or longer and wider than the bipolar battery 1. The upper retaining member 20a has open portions 26a, 26b, and 26c that are open in the stacking direction. The open portion 26a is of a size that corresponds to the first region A, and the open portions 26b and 26c are of sizes that correspond to the second regions B. A dividing portion 25 is provided between the open portion 26a and the open portion 26b, as well as between the open portion 26a and the open portion 26c such that the open portions 26a, 26b, and 26c are divided from one another.

In this way, the upper retaining member 20a in this example embodiment has the open portions 26a, 26b, and 26c that are open in the stacking direction so the open surfaces of these open portions can be used as the inflow portion 23 and the outflow portions 24. That is, by using the open surface of the open portion 26a as the coolant inflow portion 23 and the open portions 26b and 26c as the coolant outflow portions 24, the inflow portion 23 and the outflow portions 24 can be arranged parallel to each other on the same side of the bipolar battery 1 in substantially parallel planes in the stacking direction.

Accordingly, the duct D1 that supplies coolant to the inflow portion 23 and the duct D2 that discharges coolant flowing out from the outlet portion 24 can be structured as a single duct, thereby reducing the number of parts. Compared with a structure such as that of the related art in which at least two ducts must be provided on the coolant inflow and outflow sides, less space is required to arrange the ducts, which means that the bipolar battery 1 takes up less space.

Incidentally, in FIG. 6, the open portions 26a, 26b, and 26c have the same sectional area with respect to the stacking direction, but they may also be formed to have different sectional areas with respect to the stacking direction. For example, the open surface on the bipolar battery 1 side may be the same size as the first or second regions, while the open surface on the side where the duct is provided may be smaller than the open surface on the bipolar battery 1 side.

Figure 7:
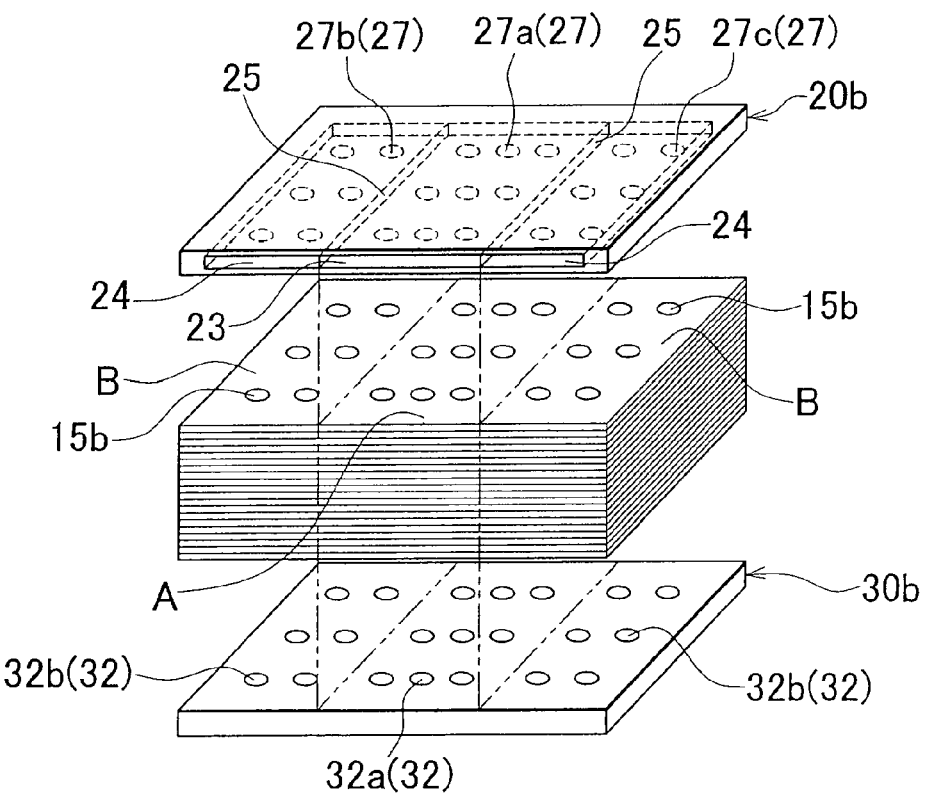
FIG. 7 is an exploded perspective view of a power storage device according to a third example embodiment of the invention.

FIG. 7 is an exploded perspective view of a power storage device according to a third example embodiment of the invention. In this example embodiment, the upper retaining member 20 and the lower retaining member 30 in the first example embodiment described above have structures corresponding to the holes 15 formed in the bipolar battery 1. Incidentally, structure of the third example embodiment that is the same as that of the first example embodiment will be denoted by like reference characters and descriptions of that structure will be omitted.

That is, as shown in FIG. 7, an upper retaining member 20b is formed in a plate shape with the inside being hollow. A plurality of holes 27 (27a and 27b) are formed in the surface of the upper retaining member 20b that faces the bipolar battery 1, in positions corresponding to the plurality of holes 15 formed in the bipolar battery 1. Incidentally, in the drawing, the holes 27 formed corresponding to the first region A are denoted by the reference character 27a, while the holes 27 formed corresponding to the second regions B are denoted by the reference character 27b.

Also, the lower retaining member 30b may also be formed in a plate shape with the inside being hollow, similar to the upper retaining member 20b. Also like the upper retaining member 20b, a plurality of holes 32 (32a and 32b) are formed in the surface of the lower retaining member 30b that faces the bipolar battery 1, in positions corresponding to the plurality of holes 15 formed in the bipolar battery 1. Incidentally, in the drawing, the holes 32 formed corresponding to the first region A are denoted by the reference character 32a, while the holes 32 formed corresponding to the second regions B are denoted by the reference character 32b.

In this way, in this example embodiment, the one end surface and the other end surface of the bipolar battery 1, with the exception of the holes 15, abut against the surface of the upper retaining member 20b on the bipolar battery 1 side and the surface of the lower retaining member 30b of the bipolar battery 1, respectively. Thus, the upper retaining member 20b and the lower retaining member 30b can appropriately and reliably sandwich (i.e., retain) the bipolar battery 1 in the stacking direction.

Figure 8A:
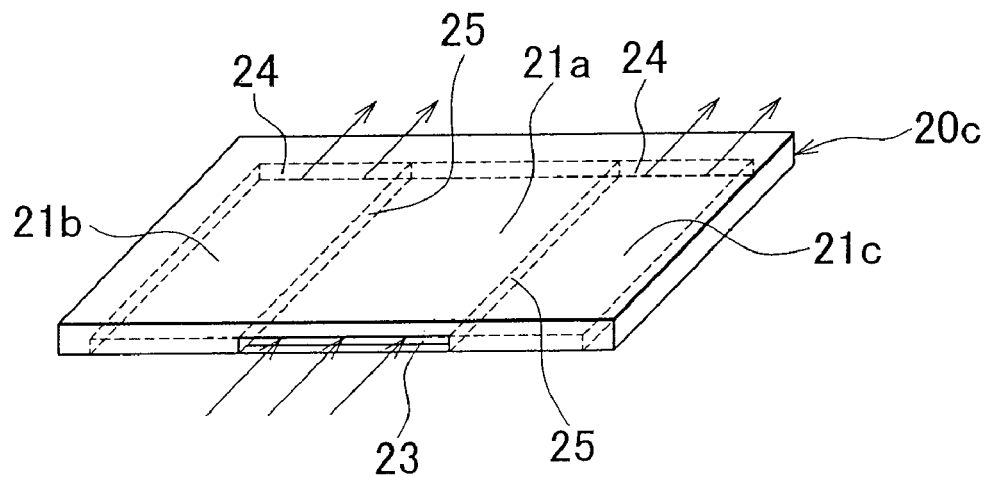
FIGS. 8A and 8B are views of modified examples of an upper retaining member of the power storage device.
Figure 8B:
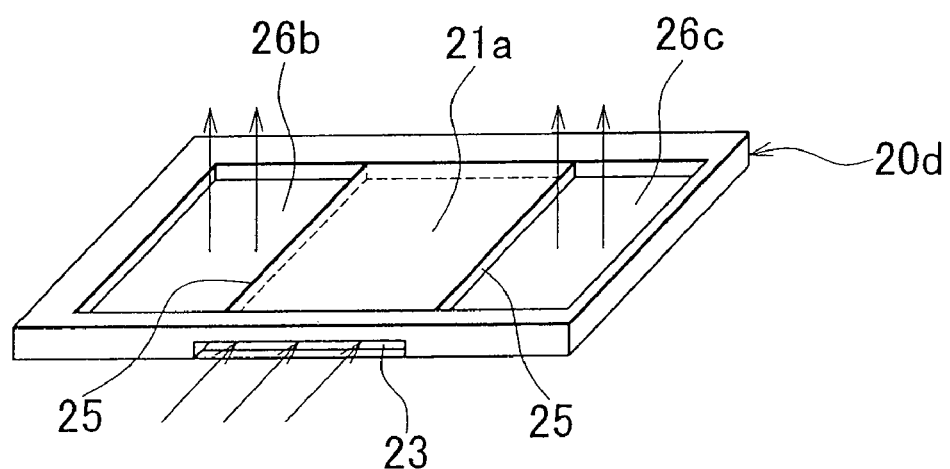
Figure 9A:
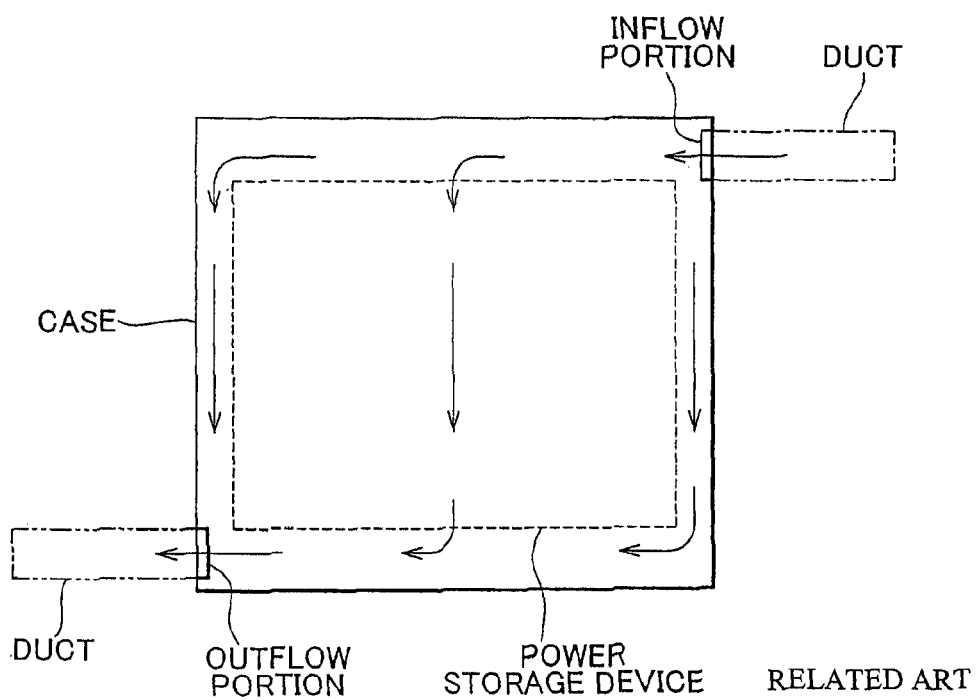
FIGS. 9A and 9B are views illustrating cooling methods according to related art.
Figure 9B:
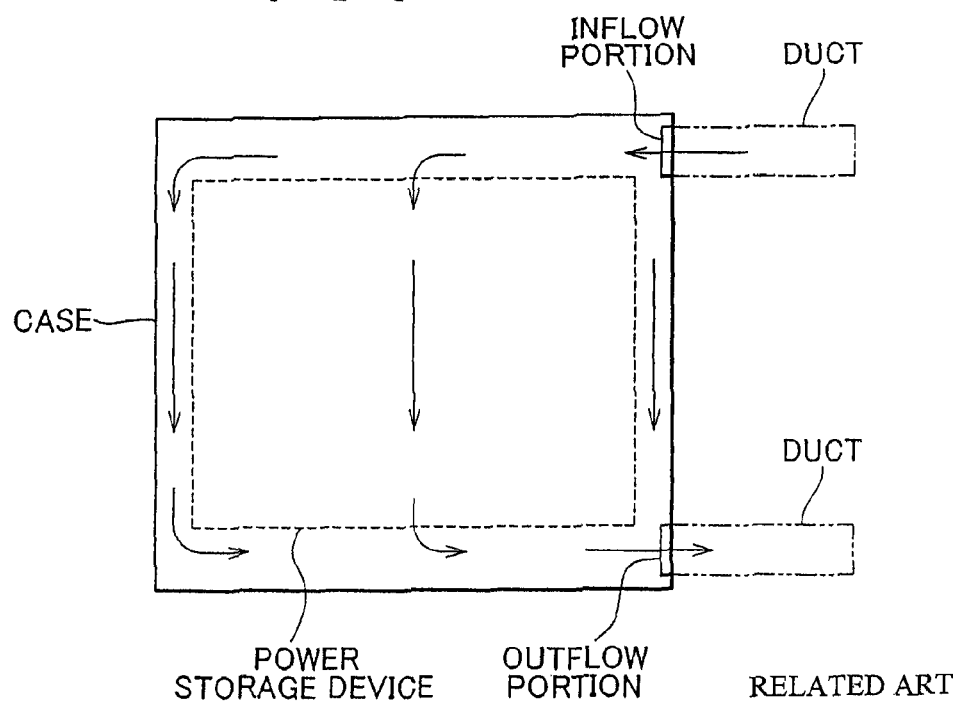

FIGS. 8A and 8B are views showing modified examples of the upper retaining member of the power storage device of the invention.

With the upper retaining members 20c and 20d of this modified example, the inflow portion 23 and the outflow portions 24 are neither arranged parallel to each other on the same side of the bipolar battery 1 in planes that are substantially parallel in the stacking direction, nor arranged on the same side of the bipolar battery 1 in a plane perpendicular to the stacking direction as they are in the first through the third example embodiments. Incidentally, structure of this modified example that is the same as the structure of the first example embodiment will be denoted by the same reference characters and descriptions of that structure will be omitted.

That is, as shown in FIGS. 8A and 8B, the inflow portion 23 and the outflow portions 24 are arranged on different surfaces with both of the upper retaining members 20c and 20d. Therefore, although it is difficult to reduce the amount of space required for the ducts, and thus the amount of space required for the bipolar battery 1, as in the first through the third example embodiments, it is possible to suppress a variation in the temperature distribution of the bipolar battery 1 in a plane perpendicular to the stacking direction when these upper retaining members 20c and 20d are used with the bipolar battery of the invention.

FIG. 8A shows the inflow portion 23 provided on one side surface of the upper retaining member 20c and an outflow portion 24 provided on the another side surface of the upper retaining member 20c. FIG. 8B shows a combination of the first and second example embodiments described above, with the open portions 26b and 26c provided in positions corresponding to the second regions B of the upper retaining member 20d, and the inflow portion 23 provided together with the first recessed portion 21a in a position corresponding to the first region A.

In the example embodiments described above, the recessed portion 31 is provided as a guide portion in the lower retaining member 30 and this recessed portion 31 leads coolant that has passed through the holes 15a of the first region A into the holes 15b of the second regions. However, the invention is not limited to this. For example, as with the retaining member 20 described above, recessed portions that correspond to the first region A and the second regions B, respectively, may be provided and a communicating portion which provides communication between these recessed portions may be provided as the guide portion. Incidentally, in the first example embodiment, a recessed portion is formed both in the upper retaining member 20 and the lower retaining member 30 but this is only because it is necessary to provided space for the coolant to flow between the retaining member and the surface of the bipolar battery on the retaining member side in the first region. The recessed portions in the first example embodiment are not necessary with the structure of the third example embodiment.

Incidentally, the coolant may either be gas coolant or liquid coolant. An example of a liquid used for cooling is a fluorinated inert fluid such as Fluorinert™, Novec™ HFE (hydrofluoroether), or Novec™ 1230 from 3M Corporation. Also, a liquid other than fluorinated inert fluid (such as silicon gel) may also be used. An example of a gas used for cooling is a dry gas such as air or nitrogen gas.

Also, the electrode layers 12 and 13 of the bipolar battery 1 may include active material for the positive electrode and the negative electrode. Further, the electrode layers 12 and 13 may also include a conductive aid, a binder, an inorganic solid electrolyte to increase ion conductivity, a polymer gel electrolyte, a polymer electrolyte, and an additive and the like as necessary.

For example, with a nickel-metal hydride battery, nickel oxide may be used as the active material of the positive electrode layer 12, and a hydrogen storing alloy such as $MmNi_{(5-x-y-z)}Al_xMn_yCo_z$ (Mm: misch metal) may be used as the active material of the negative electrode layer 13. Also, with a lithium secondary battery, a lithium-transition metal composite oxide may be used for the active material of the positive electrode layer 12, and carbon may be used for the active material of the negative electrode layer 13. Also, acetylene black, carbon black, graphite, carbon fiber, or carbon nanotube may be used for the conductive agent.

Incidentally, in the foregoing example embodiments, a bipolar electrode 10 is used, but the invention is not limited to this. For example, an electrode body in which a positive electrode layer is formed on both sides of a collector, and an electrode body in which a negative electrode layer is formed on both sides of the collector may also be used. In this case, the electrode body having the positive electrode layer and the electrode body having the negative electrode layer may be arranged (i.e., stacked) alternately with a solid electrolyte layer in between.

Also, the collector 11 may be made of aluminum foil or a plurality of metals (i.e., an alloy), for example. Also, a metal (other than aluminum), the surface of which is covered with aluminum, may also be used as the collector 11.

Incidentally, a so-called composite collector in which a plurality of metal foils are affixed together may be used as the collector 11. When this kind of composite collector is used, aluminum or the like may be used for the material of the positive electrode collector and nickel or copper or the like may be used as the material of the negative electrode collector. Also, the composite collector may be made of a positive electrode collector and a negative electrode collector that are directly contacting one another, or a positive electrode collector and a negative electrode collector with a conductive layer provided in between.

Also, the solid electrolyte layer 14 may include a particle assemblage made up of a plurality of particles, and a binder for binding this particle assemblage. An inorganic solid electrolyte or a polymer solid electrolyte may be used as the solid electrolyte layer 14.

The inorganic solid electrolyte may be, for example, a Li nitride, halide, oxyacid salt, or phosphorus sulfide compound. More specifically, the inorganic solid electrolyte may be $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $Li_2O$—$B_2O_3$, $Li_2O$—$SiO_2$, $Li_2S$—$GeS_4$, $Li_2S$—$P_2S_5$, or $LiI$—$Li_2S$—$P_2S_5$.

Also, the polymer solid electrolyte may be, for example, material made of the foregoing electrolyte and a polymer that dissociates the electrolyte, or material in which a polymer has an ion dissociable group. The polymer that dissociates the electrolyte may be, for example, a polyethylene oxide derivative and a polymer that includes that derivative, a polypropylene oxide derivative and a polymer that includes that derivative, or a phosphate ester polymer. Incidentally, an inorganic solid electrolyte and a polymer solid electrolyte may also be used in combination.

For the polymer solid electrolyte, polyethylene oxide (PEO), polypropylene oxide (PPO), or a copolymer of these may be used, for example. this polymer solid electrolyte contains lithium salt to ensure ion conductivity. The lithium salt may be, for example, $LiBF_4$, $LiPF_6$, $LiN(SO_2CF_3)_2$, $LiN(SO_2C_2F_5)_2$ or a mixture of these.

Also, in the foregoing example embodiments, the sectional shape (i.e., the shape in the stacking plane) of the holes 15 is substantially circular but the invention is not limited to this. More specifically, the sectional shape of the holes 15 may be curved (e.g., elliptical) or it may be multiangular.

Also in the foregoing example embodiments, only the holes 15 are formed in the bipolar battery 1 but the invention is not limited to this.

More specifically, tube-shaped members, e.g., hollow circular metal pins, may be arranged in the holes 15 which are provided with an insulating layer 16. Also, holes without an insulating layer may be formed in the bipolar battery 1 and hollow metal pins that are covered with an insulating layer may be inserted into these holes.

Incidentally, the hollow pins are not limited to being metal, i.e., they may be made of other material. That is, any material may be used as long as it can lead the coolant into the bipolar battery 1. Hence, the material is not limited as long as it has a hollow structure. Taking the cooling efficiency of the bipolar battery 1 into account, metal material with relatively high heat conductivity may be used as the material for the hollow pins.

Also, the sectional shape of the hollow pins may follow the sectional shape of the holes 15 or the sectional shapes of the holes 15 and the hollow pins may be different. However, if the shapes are different, the hollow pins still must be able to be inserted into the holes 15.

Further, in the foregoing example embodiments, the holes 15a and 15b extend in the stacking direction but the invention is not limited to this. That is, the holes only need to extend through the bipolar battery 1. For example, the holes 15a may be slanted with respect to the stacking direction, and the angle of slant may be set appropriately.

Also, the foregoing example embodiments describe a case in which a solid electrolyte layer 14 is used. However, the invention is not limited to this. That is, a gel or liquid electrolyte may also be used. For example, nonwoven fabric which functions as a separator and contains an electrolytic solution may be used. In this case, a sealant must be used to prevent the liquid electrolyte or the like from leaking out of the bipolar battery 1.

Also, in the foregoing example embodiments, a plurality of holes 15a and 15b all having generally the same diameter were formed in the bipolar battery 1. However, the diameters of these holes may also be different. That is, the diameters of the holes 15a and 15b may be made progressively smaller from substantially the center portion in the stacking surface toward the outer peripheral portion side. Also, instead of making the diameters of the holes 15a and 15b different, the structural density of the holes 15a and 15b may be made to differ between the first region A and the second regions B. Incidentally, the structural density of the holes in this case refers to the area occupied by the holes in the first and second regions.

As described above, heat tends to build up easier in the center portion of the stacking surface than in the outer peripheral portion of the stacking surface of the bipolar battery 1 which has a stacked structure. Therefore, the structural density of the holes 15a in the region on the center portion side (i.e., in the first region) can be made higher than the structural density of the holes 15b in the regions on the outer peripheral portion side (i.e., in the second regions).

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:

1. A power storage device comprising:
   a power storing body that has a stacked structure; and a plurality of holes that extend from one end side to the other end side in a stacking direction of the power storing body and through which coolant flows, the plurality of holes including a first hole provided in a first region which is positioned at substantially a center portion of the power storing body and a second hole provided in a second region which is closer to an outer periphery of the power storing body than the first region; and
   a guide portion that leads coolant which has passed through the first hole into the second hole.

2. The power storage device according to claim 1, wherein the coolant flows from outside the power storing body into the first hole, and from the second hole to outside the power storing body.

3. The power storage device according to claim 1, wherein the guide portion leads coolant that has passed through the first hole into the second hole such that an inflow side of the coolant in the first hole and an outflow side of the coolant in the second hole are on the one end side in the stacking direction of the power storing body.

4. The power storage device according to claim 1, further comprising:
   a pair of retaining members that retain the power storing body in the stacking direction; and
   an inflow portion through which coolant flows into the first region and an outflow portion through which coolant flows out from the second region to outside the power storage device, wherein the inflow portion and the outflow portion are provided on one of the retaining members and the guide portion is provided on the other retaining member.

5. The power storage device according to claim 4, wherein the inflow portion and the outflow portion are provided on the same side of the one retaining member.

6. The power storage device according to claim 5, wherein the inflow portion and the outflow portion are provided adjacent to one another in the lengthwise direction of the one retaining member.

7. The power storage device according to claim 4, wherein the one retaining member has a dividing portion that separates the coolant that flows into the inflow portion from the coolant that flows out from the outflow portion.

8. The power storage device according to claim 7, wherein the one retaining member has a recessed portion on a surface that faces the power storing body, and the recessed portion is divided into a portion corresponding to the first region and a portion corresponding to the second region by the dividing portion.

9. The power storage device according to claim 7, wherein the one retaining member has an open portion that is open in the stacking direction of the power storing body, and the open portion is divided into a portion corresponding to the first region and a portion corresponding to the second region by the dividing portion.

10. The power storage device according to claim 7, wherein the one retaining member is formed in a plate shape with a hollow portion inside, and the hollow portion is divided into a portion corresponding to the first region and a portion corresponding to the second region by the dividing portion.

11. The power storage device according to claim 7, wherein a surface of the one retaining member on the side that faces the power storing body has a plurality of holes in positions corresponding to the holes provided in the power storing body.

12. The power storage device according to claim 1, wherein an insulating layer is formed on the inner peripheral surfaces of the plurality of holes.

13. The power storage device according to claim 1, wherein the second region is a region that sandwiches the first region from both sides.

14. The power storage device according to claim 1, wherein the second region is a region that surrounds the first region.

15. The power storage device according to claim 1, wherein the power storing body is provided in plurality, the plurality of power storing bodies being stacked in the stacking direction.

16. The power storage device according to claim 1, wherein the power storing body has an electrolyte layer and a plurality of electrode bodies that are stacked with the electrolyte layer in between, and the plurality of holes are provided through the power storing body so as to extend from the one end side of the power storing body to the other end side of the power storing body.

17. A method of manufacturing the power storage device according to claim 16, wherein the power storing body having the plurality of holes is formed by applying a material that forms the electrode bodies and the electrolyte layer, but without applying the material to the portions where the holes are formed.

18. A method of manufacturing the power storage device according to claim 16, wherein the electrode bodies and the electrolyte layer are first formed and then stacked together, and the plurality of holes are formed during the process of forming the electrode bodies and the electrolyte layer.

* * * * *

UNITED STATES PATENT AND TRADEMARK OFFICE
CERTIFICATE OF CORRECTION

PATENT NO. : 8,298,699 B2
APPLICATION NO. : 12/527842
DATED : October 30, 2012
INVENTOR(S) : Yoshiyuki Nakamura It is certified that error appears in the above-identified patent and that said Letters Patent is hereby corrected as shown below:

ON THE TITLE PAGE, ITEM [73]:

Change Assignee from "Toyota Jidosha Kabushiki Kaihsa" to --Toyota Jidosha Kabushiki Kaisha--.

IN THE SPECIFICATIONS:

COLUMN 10, LINE 17:

Change "to provided space" to --to provide space--.

COLUMN 11, LINE 29:

Change "example. this polymer" to --example. This polymer--.

Signed and Sealed this
Twenty-eighth Day of May, 2013

Teresa Stanek Rea
*Acting Director of the United States Patent and Trademark Office*